United States Patent [19]

Talmadge et al.

[11] Patent Number: 4,802,027
[45] Date of Patent: Jan. 31, 1989

[54] DATA STORAGE DEVICE COUPLED TO A DATA STORAGE INTERFACE

[75] Inventors: Paul C. Talmadge, Ansonia; David H. Brooks, Wilton, both of Conn.

[73] Assignee: Pitney Bowes Inc., Stamford, Conn.

[21] Appl. No.: 104,128

[22] Filed: Oct. 5, 1987

[51] Int. Cl.[4] .......................................... G11B 15/04
[52] U.S. Cl. ...................... 360/60; 360/120; 360/121; 360/132; 235/485; 235/486; 269/256
[58] Field of Search ............... 400/144.2, 157.2, 355, 400/357; 439/325, 660; 235/483–486; 269/256; 360/60, 120, 121, 132

[56] References Cited

U.S. PATENT DOCUMENTS

| | | | |
|---|---|---|---|
| 2,894,220 | 7/1959 | Ridgers et al. | 333/24 R |
| 3,098,230 | 7/1963 | Nickerson et al. | 343/709 |
| 3,534,310 | 10/1970 | Pelissier | 336/205 |
| 3,596,061 | 7/1971 | Gechele et al. | 235/486 |
| 3,693,114 | 9/1972 | Kempf | 333/101 |
| 3,743,989 | 7/1973 | Nicolas et al. | 336/5 |
| 3,771,069 | 11/1973 | Levacher et al. | 333/24 C |
| 3,848,229 | 11/1974 | Perron et al. | 235/382 |
| 3,896,292 | 7/1975 | May et al. | 235/486 |
| 3,950,676 | 4/1976 | Dornseifer et al. | 361/40 |
| 4,004,133 | 1/1977 | Hannan et al. | 235/133 |
| 4,087,774 | 5/1978 | Beuchat | 336/773 |
| 4,130,242 | 12/1978 | Mannion | 235/450 |
| 4,339,668 | 7/1982 | Mueller et al. | 307/149 |
| 4,404,464 | 9/1983 | Moreno | 235/438 |
| 4,449,775 | 5/1984 | de Pommery et al. | 439/373 |
| 4,480,181 | 10/1984 | Fisher | 235/486 |
| 4,487,468 | 12/1984 | Fedder et al. | 439/325 |
| 4,492,855 | 1/1985 | Garczynski et al. | 235/485 |
| 4,493,107 | 1/1985 | Stockburger et al. | 382/58 |
| 4,547,661 | 10/1985 | Anderson | 235/485 |
| 4,587,410 | 5/1986 | Milnes | 235/382 |
| 4,605,844 | 8/1986 | Haggan | 250/343 |
| 4,629,345 | 12/1986 | Suzaki et al. | 400/208 |
| 4,700,309 | 10/1987 | Naito et al. | 235/485 |

FOREIGN PATENT DOCUMENTS 0213041 3/1987 European Pat. Off. .......... 235/486

Primary Examiner—A. D. Pellinen
Assistant Examiner—Jeffrey A. Gaffin
Attorney, Agent, or Firm—Donald P. Walker; David E. Pitchenik; Melvin J. Scolnick

[57] ABSTRACT

An electromechanical vault cartridge receptacle has an opening for inserting a vault cartridge, the cartridge passing between a pair of laterally biased rollers which continuously engage asymmetrically contoured sided surfaces of the cartridge. A front surface edge of the cartridge bears upon and causes the backwards motion of a movable frame, the motion of which causes top and bottom surfaces of the cartridge to be securely engaged between an opposed pair of horizontally planar cartridge bearing members. The bearing members comprise conductive plate means which are brought into registration with corresponding plate means beneath top and bottom surfaces of the cartridge for defining signal coupling capacitors. The backwards motion of the movable frame also results in roller supporting members to be locked when the cartridge is fully inserted, thereby preventing lateral movement of the rollers. A cartridge ejecting means comprises electromechanical means adapted for engaging a back surface of the movable frame to move the movable frame in a forwards direction, disengaging the cartridge engaging members and unlocking the roller supporting members, whereby the cartridge is pushed back out of the opening. The receptacle also comprises tapered cartridge stop means which is a primary portion of a power transformer which is adapted for physically contacting a secondary portion disposed within the cartridge for providing the cartridge with operating power.

28 Claims, 8 Drawing Sheets

DATA STORAGE DEVICE COUPLED TO A DATA STORAGE INTERFACE

FIELD OF THE INVENTION

The present invention relates generally to data storage devices, and, in particular, relates to an electromechanical receptacle for receiving, aligning, securely retaining and ejecting a vault cartridge, the receptacle further having means for the magnetic coupling of operating power and the capacitive coupling of data signals to the cartridge.

BACKGROUND OF THE INVENTION

It has been known to use portable data storage modules, such as a vault cartridge, in such applications as credit cards and in controllers coupled to a host system.

One problem associated with the use of a conventional vault cartridge is that in order to couple data signals into and out of the cartridge it is often a requirement that the cartridge be accurately aligned with data coupling devices within a host system, the host system storing and retrieving the data within the vault cartridge. Another common requirement is that the vault cartridge be securely retained within the host to prevent its intentional or inadvertent removal from the host system. Such a removal during a time when the host is storing or retrieving data within the cartridge could result in the disruption and the loss of data stored within the cartridge. In those applications were the data represents, for example, valuable accounting data such as in a postage meter device, such a data loss may prove especially disadvantageous.

Another particular problem associated with the use of such modules is that in order to couple data signals into and out of the cartridge it is often a requirement that electrical terminals be exposed upon a surface of the cartridge. These terminals may take the form of a card edge connector type terminal or other types of exposed conductive surfaces which are operable for being mated with a suitable connector in a receptacle to which the cartridge is coupled. The terminals may also take the form of optical data transmission and reception devices. The exposure of the terminals may be disadvantageous for several reasons. For example, electrically conductive terminals may, under the influence of atmospheric moisture and contaminants, become oxidized thereby decreasing the conductivity of the terminals. Another disadvantage is that the terminals are exposed to sources of electrical discharge energy, such as static electricity. As is well known, static electricity may cause the degradation or the complete failure of integrated circuit devices which are subjected to a discharge of static electricity. Such integrated circuit devices may typically be included within the data storage module for the storage of data and for performing functions associated with the storage of the data. Optical-type terminals may also be susceptible to conducting static electrical discharges into the storage module. Also, the radiation transmission and reception means, such as a lens, must be maintained free of radiation absorbing contaminates such as dirt and grease.

Due to this requirement of previous data storage modules that the data coupling terminals be in physical contact or otherwise physically accessible to the host system mating terminals, the exposure of the terminals upon a surface of the data storage module can result in the overall degradation of the operation of the module or even in the complete failure of the module to reliably store data. This problem is especially acute in relatively small and portable data storage modules which by definition may be inserted and removed a number of times from a host system. Such modules may also be especially vulnerable in that they are typically carried about in a jacket or shirt pocket where the danger of exposure to static electric discharge is increased.

Another problem associated with some conventional vault cartridges relates to the providing of operating power to the cartridge. Some cartridges contain a central processing unit (CPU) which is operable for storing data within the memory and for performing other functions, such as accounting related functions. Many cartridges also contain a battery to provide operating power for the circuits contained therein. It has also been known to provide regulated DC power through electrical contacts exposed upon a surface of the cartridge.

As can be appreciated, there are a number of disadvantages inherent in the use of such power coupling techniques. For example, if a battery is to power all of the circuits within the cartridge for an extended period of time the storage capacity and, hence, the physical size of the battery may need to be excessively large.

For those cartridges that have terminals for the coupling of regulated DC power a plurality of such terminals may be required if the cartridge requires for operation several different DC voltages. Furthermore, inasmuch as the power terminals may be directly coupled to integrated circuits within the cartridge the terminals may conduct static electric discharges into the cartridge and directly into the circuits. As has been previously noted, such static electric discharges may degrade or cause the complete failure of the circuits. Also, during coupling of the cartridge to the power terminals the circuit ground or common connection may be made after the DC power connection, resulting in possible damage to the circuits.

It is therefore one object of the invention to provide a vault cartridge having data signal coupling and power coupling means which are not susceptible to coupling external electrical interference, such as static electricity, into the cartridge.

It is another object of the invention to provide a vault cartridge for storing valuable accounting data which is inherently rugged and immune to disruptive electrical interference.

It is a further object of the invention to provide a receptacle means for a vault cartridge which accurately aligns and retains the cartridge during the operation thereof and which furthermore comprises means for coupling data signals and operating power to the cartridge.

It is a still further object of the invention to provide a vault cartridge/vault receptacle system which comprises capacitive data signal coupling means and magnetic flux power coupling means.

It is one further object of the invention to provide a vault cartridge comprising conductive plate means disposed beneath an insulating surface thereof and a secondary of a power transformer having opposing ends exposed upon the surface, the conductive plate means being brought into registration with corresponding plate means by the action of a vault receptacle to form data signal coupling capacitors, the secondary of the power transformer also being brought into registration with a primary of a power transformer for coupling operating power into the cartridge.

SUMMARY OF THE INVENTION

The foregoing problems are overcome and other advantages are realized by a data storage system comprising a data storage cartridge comprising data storage means coupled to data storage interface means, the interface means comprising means for coupling data signals between the cartridge and a host system, the interface means comprising a first plurality of conductive plate means disposed beneath at least one horizontally planar surface of the cartridge; the cartridge further comprising a secondary portion of a power transformer including a secondary core having a secondary winding disposed thereabout, the secondary winding being electrically coupled to a power conditioning means operable for deriving cartridge operating power from the secondary winding; the system further comprising apparatus for securely retaining the cartridge during the storage of data therein, the apparatus comprising means for engaging a front surface of the cartridge as the cartridge is inserted within the apparatus, the engaging means being movable, in response to the insertion of the cartridge, between at least a first position and a second position; means for engaging the horizontally planar surface of the cartridge; and means for activating the cartridge planar surface engaging means, the means for activating being coupled to the front surface engaging means and responsive to the movement thereof for causing the cartridge planar surface engaging means to securely engage the cartridge horizontally planar surface in response to the front surface engaging means moving to the second position and wherein the cartridge planar surface engaging means comprises a second plurality of conductive plate means for contacting the planar surface of the cartridge, the second plurality of plate means being disposed in registration with the first plurality of plate means for defining a plurality of electrical capacitors individual ones of which are comprised of corresponding ones of the first and the second plurality of plate means, each of the capacitors being a signal coupling capacitor for coupling at least data signals between the cartridge and the host system, the apparatus further comprising a primary portion of the power transformer being disposed at the second position for magnetically coupling operating power to the secondary portion when the cartridge is at the second position, the primary core having a primary winding disposed thereabout and a source of excitation energy coupled to the primary winding.

BRIEF DESCRIPTION OF THE DRAWINGS

The foregoing aspects and other features of the invention will become more apparent in the following detailed description of the invention taken in conjunction with the accompanying drawings wherein.

DETAILED DESCRIPTION OF THE INVENTION

Figure 1:
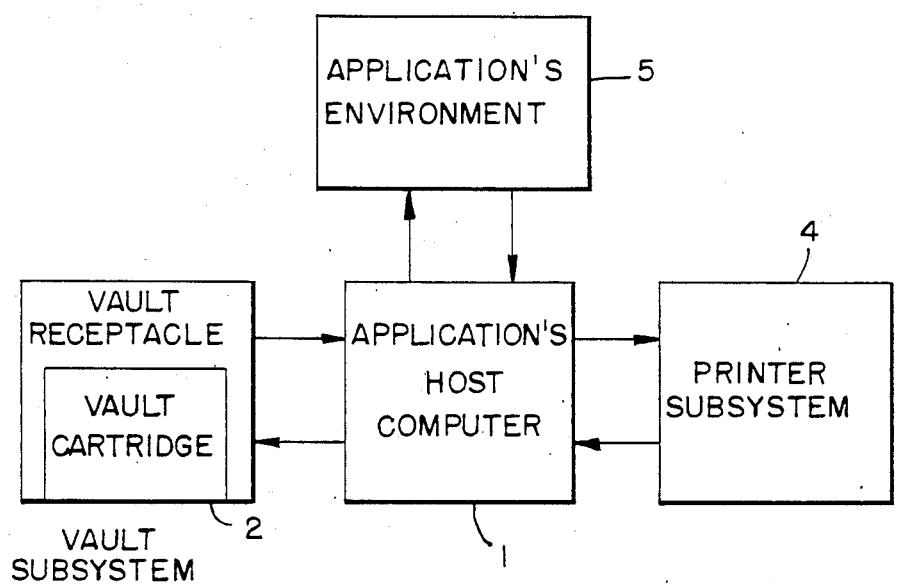
FIG. 1 is a block diagram showing a portable data storage module, or vault cartridge, coupled to an application host computer through a vault receptacle.

Referring now to FIG. 1 there is shown in block diagram form a system having an application's host computer 1 bidirectionally coupled to a vault subsystem which comprises a vault cartridge 2 coupled to a vault receptacle 3. Application's host computer 1 is also bidirectionally coupled to a printer subsystem 4 and is further bidirectionally coupled to an application's environment 5. In general, host computer 1 may be any data processing means operable for executing an application program, such as a computer operable for executing a postage dispensing application program. The application's environment 5 may be a user of the host computer or may also be another computing system which is coupled to the application's host computer and is operable for transmitting data to and receiving data from the application's host computer 1. The block designated as 5 may comprise a familiar CRT screen and a keyboard which are both operable for providing an operator with a means for interacting with the application's host computer 1. Vault cartridge 2 may comprise a data storage means operable for storing data generated by the application's host computer 1. The vault cartridge 2 may also comprise, for example, ascending and descending postage registers which are maintained within the cartridge 2 in a secure environment. The vault receptacle 3 may be an electromechanical mechanism having electronic and electrical power coupling means for coupling data into and out of the vault cartridge 2 and also for providing operating power thereto. In accordance with the invention, the vault cartridge 2 may be detachably coupled to the vault receptacle enabling the cartridge to be removed and inserted as desired by a user or some operator of the system. Printer subsystem 4 may be any suitable printing means which is operable for receiving data from the application's host computer for printing. The printer subsystem 4 may be a printer operable for printing postage indicia which are representative of a monetary value of postage. Printer subsystem 4 may be a secure printer system which is bidirectionally coupled to the application host computer 1 for receiving therefrom and transmitting thereto security codes such as cryptographic codes which enable the printer subsystem 4 to print. Although shown as a plurality of separate blocks, it should be realized that the application's host computer 1, the vault cartridge, the vault receptacle 3 and the printer subsystem 4 may all be contained within a single system. That is, these blocks may not be independent systems but the functions thereof may all be incorporated within one system. Similarly, different combinations of the blocks are possible such that the application's host computer 1 and the vault system may comprise one system having a printer subsystem coupled thereto through a suitable cable or some other data transmission means.

As an example of the operation of such a system, the application's host computer 1 may receive a request from the application's environment 5, such as a request from a user to print a postage indicia representative of a monetary value of postage. In response thereto, the application's host computer 1 may interrogate the vault cartridge 2 within vault receptacle 3 to determine if the descending register securely contained therein indicates a sufficient value of postage funds to print the desired value of postage. Upon receiving an indication from the vault cartridge 2 that such funds are available the application's host computer may thereafter send data to the printer subsystem 4 which causes the printer subsystem 4 to print the postage indicia indicating the desired monetary value. Of course, such a system as depicted in FIG. 1 may be adapted to a wide number of applications such as the printing of lottery tickets or the printing of tax stamps, such as the stamps affixed to liquor and cigarettes.

Figure 2:
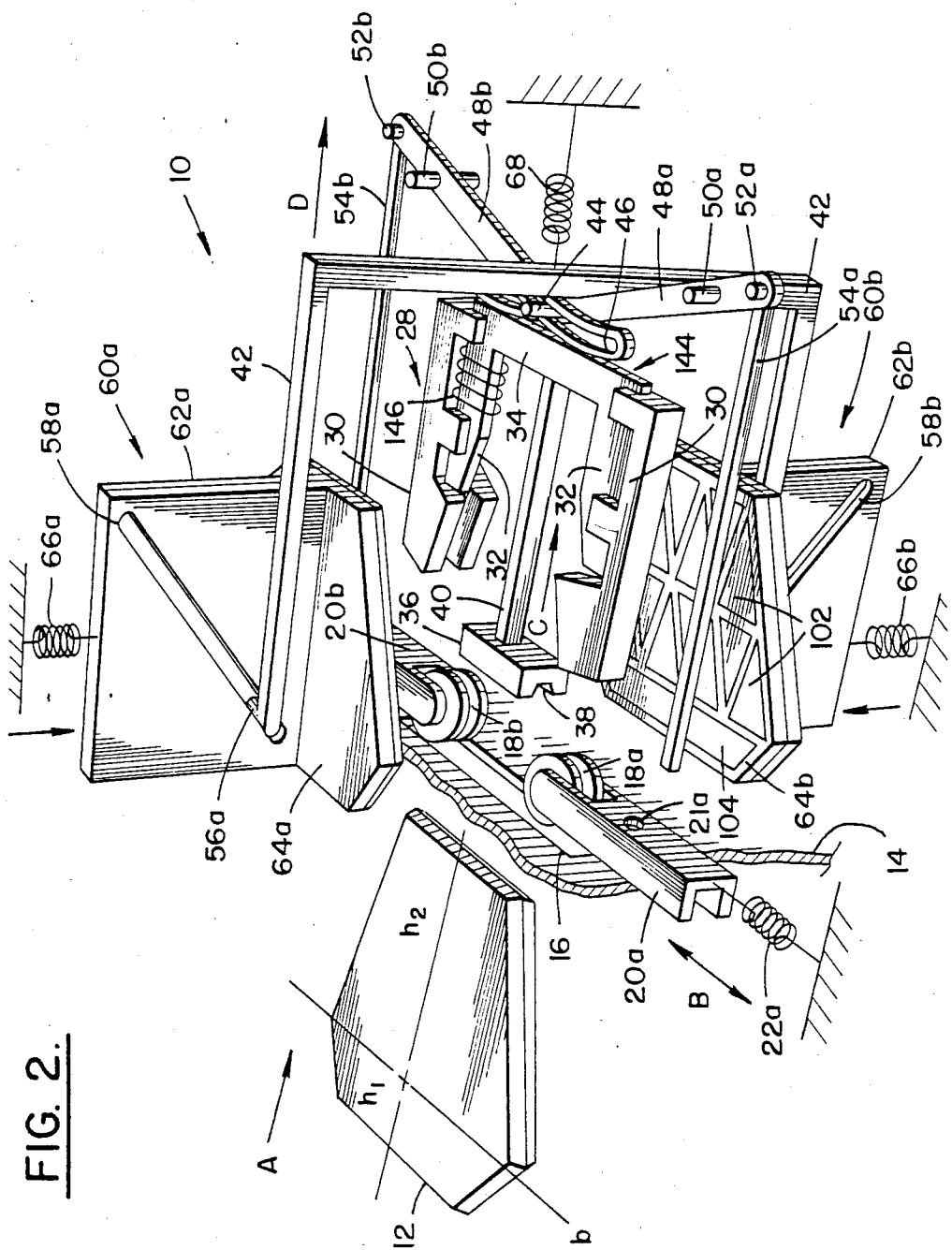
FIGS. 2, 3, 4 and 5 are each a side elevational view of the receptacle in various stages of engagement with a vault cartridge.

Referring now to FIGS. 2, 3, 4 and 5 there is shown a portion of the vault subsystem of FIG. 1. As can be seen, the vault subsystem is comprised of a vault receptacle 10 and a vault cartridge 12. In the view of FIG. 2 the vault cartridge 12 is positioned to be inserted within the receptacle 10 in the manner indicated by the arrow A. A portion of receptacle outer wall 14 is shown having an opening 16 made therein, the opening 16 having dimensions suitable for accommodating at least the widest transverse dimension and also the thickness of the cartridge 12 as the cartridge 12 is inserted therethrough. Disposed on either side of the interior portion of opening 16 are a pair of roller means comprising rollers 18a and 18b and roller supporting members 20a and 20b. Each of the rollers 18 has a shaft (not shown) passing through a centrally disposed opening, each shaft being supported by the roller supporting members 20a and 20b, respectively. Supporting members 20a and 20b are each provided with a lateral biasing means, only the biasing means associated with member 20a being shown. The biasing means may be a spring member 22a or any other suitable flexible compression means which is operable for urging member 20 and an attached roller 18 against the sides of the module 12 in a direction substantially perpendicular to a longitudinal centerline of the cartridge 12.

Figure 6:
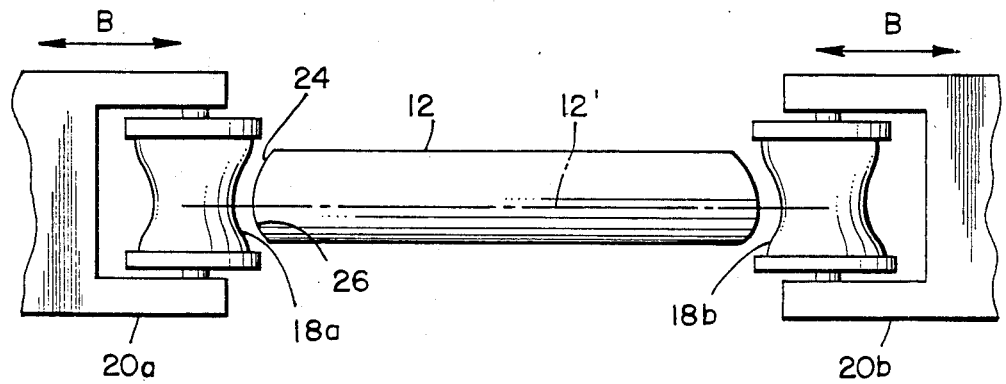
FIG. 6 shows a front edge of a vault cartridge having a symmetrical radiussed side edges in conjunction with opposing rollers having a corresponding shape.

Referring to FIG. 6 in conjunction with FIG. 2 there is shown an end view of one possible embodiment of the cartridge 12, the view looking out through the opening 16. As can be seen, the cartridge 12 is asymmetric about a horizontally disposed plane 12', passing through the center thereof. The rollers 18a and 18b have an asymmetrical contour the shape of which is predetermined to match the asymmetrical shape of cartridge 12. As can be seen, an upper portion 24 of cartridge 12 has a radiussed edge having a larger radius of curvature than a lower portion 26. Thus, it can be realized that when the cartridge 12 is inserted through opening 16 in the direction shown by the arrow A of FIG. 2, that the side surfaces of the cartridge will engage the contoured rollers 18, thereby allowing the entry of the cartridge 12. If the cartridge 12 were rotated 180 degrees about a longitudinal axis in the view of FIG. 6, it can be appreciated that the shape of the cartridge in conjunction with the contoured rollers would impede the entry of the cartridge. It can further be appreciated from FIG. 2 that due to the asymmetrical shape of the cartridge as viewed from the top thereof, that the cartridge must be inserted with the narrower end portion first. If the wider end portion were inserted first the initial spacing of the rollers would not permit the cartridge to be inserted through the opening 16. Thus, it can be appreciated that if the cartridge is provided with an asymmetrical shape in both horizontally and vertically disposed central planes, that the cartridge can be inserted in only one predefined orientation into the receptacle 10. For example, the cartridge 12 may have an overall top surface shape defined by two trapezoids having a common base (b) and unequal heights ($h_1$ and $h_2$) In a preferred cartridge embodiment b has a length of approximately 3.5 inches while $h_1$ and $h_2$ are approximately 1.0 inch and 3.5 inches, respectively. This feature of the invention will be more fully described below.

It should be realized that cartridge 12 will typically comprise data signal coupling means which interface with corresponding data signal coupling means in the receptacle 10. Cartridge 12 typically also comprises input power coupling means which interface with corresponding output power coupling means in the receptacle 10. Thus, the insertion of the cartridge in a predefined orientation is desirable in that the alignment of the data coupling and power coupling means is facilitated. These aspects of the invention will be described in detail below.

Returning now to FIG. 2 it can be seen that the receptacle 10 also comprises a cartridge stop means such as a fixed frame member 28 which is comprised of a forward and a rear side frame member 30 and 32, respectively. Members 30 and 32 are joined at one end to a cross support member 34 which maintains the spacing and alignment between the frame members 30 and 32. As can be seen, the members 30 and 32 have a tapered inner opening which has an angle of inclination which is substantially equal to the angle of inclination of the side edges of the cartridge 12, thereby accurately aligning the cartridge 12 between opposing members 30 and 32 when cartridge 12 is fully inserted. The fixed frame member 28 may be fixed to a portion of a supporting structure, not shown, within the receptacle 10 to maintain a fixed distance between the frame member 28 and the rollers 18. In accordance with one aspect of the invention, members 30 and 32 comprise a portion of a U-shaped power transformer primary circuit, the secondary of the transformer being provided within the cartridge 12. This aspect of the invention will be described in detail hereinafter.

Receptacle 10 also comprises a cartridge front surface engaging member 36 which has a slot 38 made in a front face thereof. The slot 38 may have a contour which matches the variably radiussed contour of the end of vault cartridge 12. Thus, it can be seen that as the cartridge 12 is inserted within the receptacle 10 the front surface of the cartridge will engage the slot 38 and as the cartridge is further inserted through the opening 16 that the cartridge will bear upon the front surface engaging member 36 such that the member 36 will be urged in a direction shown by the arrow C. Attached to the member 36 may be a bar-like supporting member 40 which is attached at an opposite end thereof to a movable frame member 42. Movable frame member 42 comprises a rotational coupling means such as a vertical pin 44 affixed to a central portion, the pin 44 passing through elongated curved slots 46 made within a pair of movable arm members 48a and 48b. Each of the members 48a and 48b is also provided with a rotational coupling means such as a pin 50a and 50b, respectively, each of the pins 50 engaging an opening within a supporting frame (not shown) such that the arms 48 rotate about their respective pins 50. Each of the arm members 48 is further provided with another rotational coupling means such as a pin 52a and 52b, respectively, the pins 52 being disposed at the ends of the arm members 48 and passing through an opening made therethrough. Rotatably coupled to each of the arm members 48a and 48b by one of the the pins 52 is a locking member 54a and 54b, respectively, the operation of which will be described in detail hereinafter.

Movable frame member 42 may be generally U-shaped, having ends which terminate in a slot engaging member, such as a right angle member 56, the member 56 slideably engaging slots 58a and 58b made within an upper and a lower cartridge compression means 60a and 60b, respectively. Each of the compression means 60 has a vertical upstanding member 62 and a horizontally disposed planar bearing member 64. The bearing member 64 may have a shape which is similar to that of the cartridge 12. Each of the compression means 60 is further provided with a biasing means, such as a spring member 66, which exerts a force upon the compression means 60 to urge the members 64 toward one another, thereby compressing the cartridge 12 therebetween when the cartridge is fully inserted and seated within fixed frame member 28. Movable frame means 42 is also provided with a biasing means, such as a spring member 68, which is operable for being compressed when the movable frame member is moved in the direction of arrow D, this movement being due to the force exerted by the cartridge 12 upon the end engaging member 36, as indicated by the arrow C.

Figure 3:
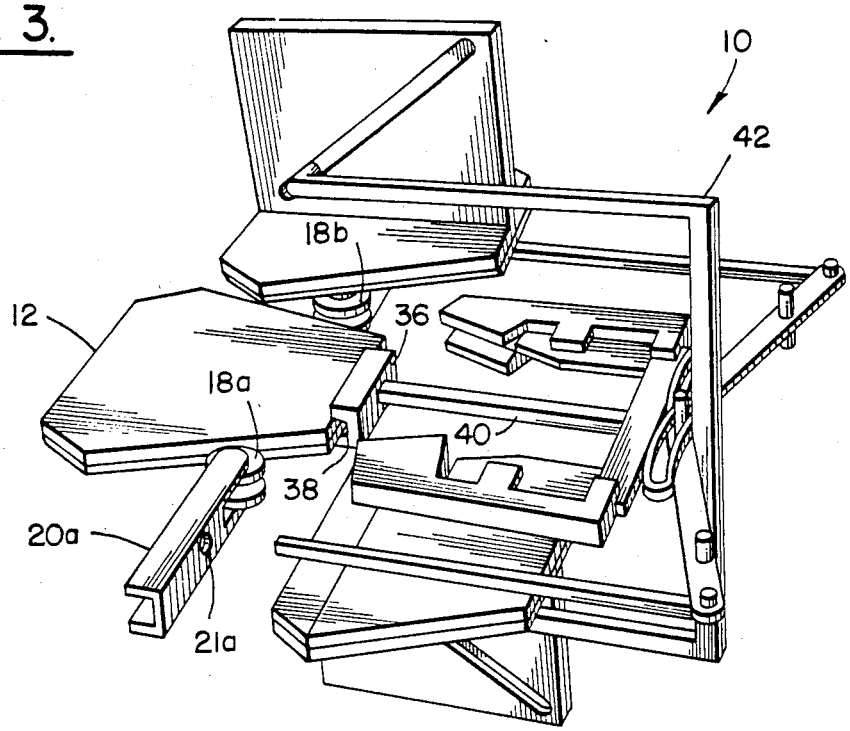
Figure 4:
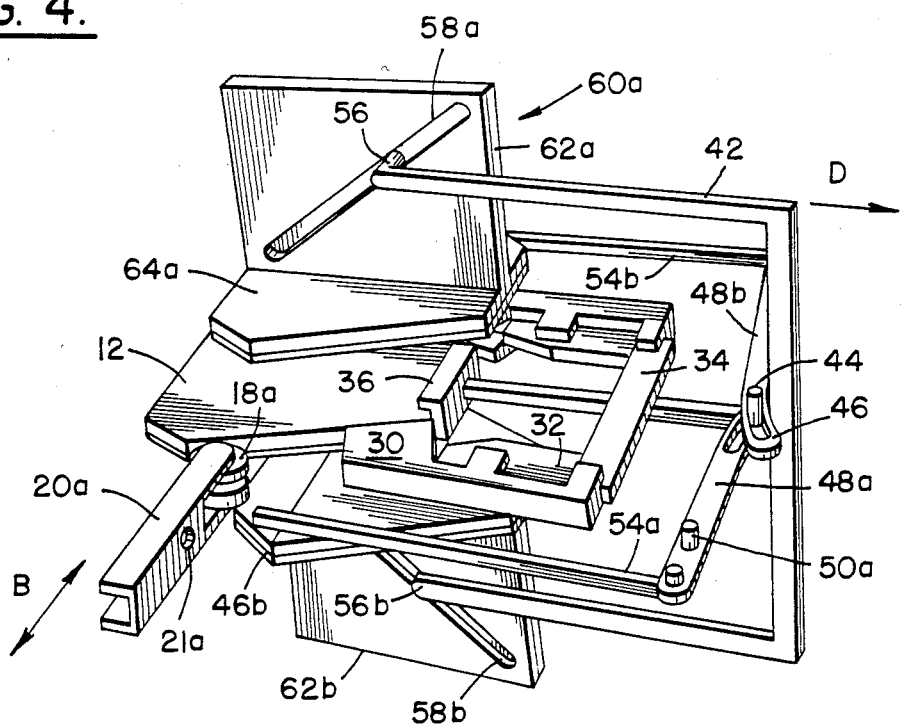
Figure 5:
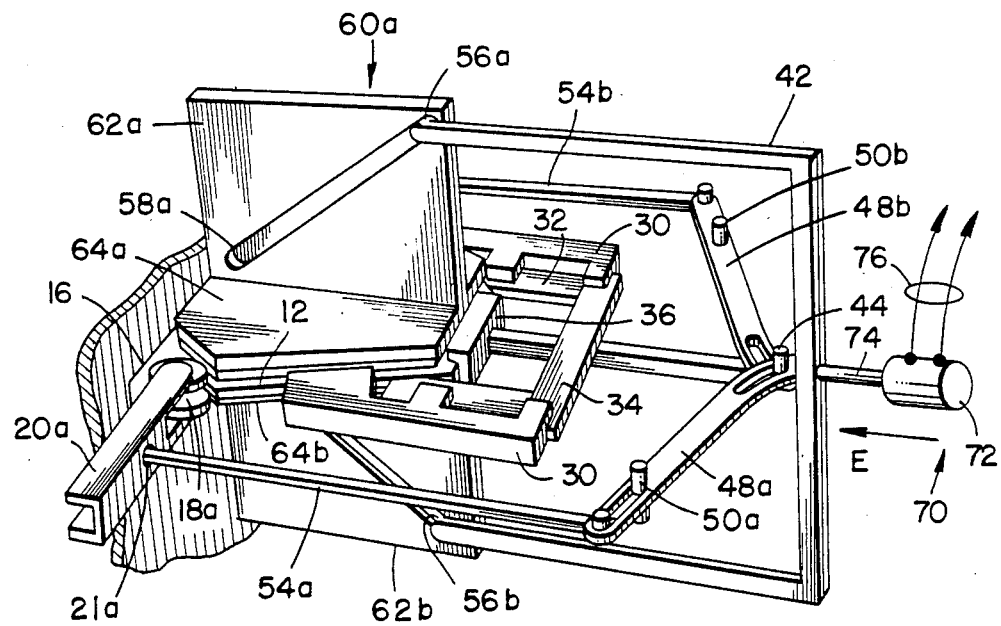

The foregoing aspects of the invention can be clearly seen in FIGS. 3, 4 and 5 which illustrate in a consecutive time sequence the operation of the vault receptacle 10 as the vault cartridge 12 is inserted therein. In FIGS. 3, 4 and 5 certain elements shown in FIG. 2 have been eliminated in order to more clearly illustrate the operation of the apparatus. For example, the various biasing means are not shown and, also, the opening 16 within the wall 14 may not be shown.

As can be seen in FIG. 3 the front edge of vault cartridge 12 has been inserted through the opening 16 (not shown) until the front edge of the cartridge 12 has engaged the slot 38 within the member 36. The rollers 18 have moved apart to accommodate the cartridge 12, the springs 22 exerting an inwardly directed force on roller supporting members 20 to urge the rollers against the cartridge side surface.

Referring now to FIG. 4, it can be seen that the vault cartridge 12 has been more fully inserted within the receptacle 10. That is, the cartridge 12 has been inserted up to the point where the rollers are about to pass over the widest portion of the cartridge 12. This has resulted in the lateral movement of the roller supporting members 20 to approximately their widest spacing one from another. At this time it can be seen that the engaging member 36 and the movable frame 42 have moved in a direction away from their original positions as shown in FIGS. 2 and 3. The movement of movable frame 42 results in the rotation of the arms 48 about the pins 50. The ends of arms 48 nearest to frame 42 also rotate about the pin 44 which passes through the elongated slots 46. This rotation further results in the locking members 54 moving in a direction opposite to the movement of frame member 42. That is, locking members 54 have moved towards the roller supporting members 20. Due to the lateral motion of the roller supporting members 20 a pair of locking arm engaging holes 21 are not yet aligned with the ends of locking members 54. As can be further seen, due to the direction of motion of movable frame member 42 the upper right angle portion 56 is moving upward along the slot 58. The springs 66, it should remembered, exert a compressive force upon each of the compression means 60, that force being in a direction urging the bearing members 64 towards one another.

Referring now to FIG. 5 there is shown the position of the various components of the receptacle 10 when the cartridge 12 has been fully inserted therein. As can be seen, the widest portion of the cartridge has passed the rollers 18, the rollers 18 thereafter, under the influence of springs 22, have moved back towards one another as they ride over the inwardly tapering back portion of the cartridge 12. Having reached this position, the openings 21 are aligned with the ends of locking members 54 which, due to the continued forward movement of arms 48, have seated within the openings 21. Compression means 60a and 60b are now also fully engaged, the bearing member 64a bearing upon a top surface of the vault cartridge 12 while the member 64b bears against the bottom surface of the cartridge 12. To facilitate this operation of bearing members 64, each may comprise a layer of compressible foam or rubber-like material the resilience of which permits the bearing members 64 to tightly compress the cartridge 12 therebetween. Such a compressive engagement is especially desirable inasmuch as the bearing members also in accordance with the invention, comprise data coupling means for coupling data into and out of the cartridge 12 which, also in accordance with the invention, is a capacitive data coupling means which will be described in detail below.

It can be appreciated that when the cartridge 12 is fully inserted within the receptacle 10 that any attempt by an operator to remove the cartridge through the opening 16 would be extremely difficult. Inasmuch as bearing members 64 have substantially covered the entire upper and lower surface of the cartridge 12, there is very little surface area, if any at all, with which to grasp the cartridge 12 in order to attempt to retract it from the receptacle 10. Also, due to the compressive force exerted by the springs 66, the cartridge 12 is held firmly between the two bearing members 64. Also, inasmuch as locking members 54 are seated within openings 21, lateral movement of rollers 18 is substantially prevented. Due to the shape of cartridge 12, some lateral movement of rollers 18 is necessary to remove the cartridge 12 in order to cause the rollers to pass over the widest part of cartridge 12. As can be seen, the final rest position of the rollers is on the back surface of the cartridge 12 behind the widest portion of the cartridge. Hence, removal of the cartridge 12 when the cartridge 12 is fully inserted cannot be accomplished by an operator without the activation of a cartridge ejection means, such as a linear motion solenoid 70.

As can be seen in FIG. 5 solenoid 72 is comprised of a body 72 and a spring loaded plunger 74 which, when the solenoid 70 is energized by a suitable voltage through leads 76, moves in a direction as indicated by the arrow E. A terminal portion of plunger 74 comes into contact with and exerts a force upon the movable frame 42, causing the frame 42 to move in a forward direction towards opening 16. This forward movement of frame 42 causes a retraction of locking members 54, disengaging members 54 from openings 21 and thereby releasing roller supports 20 for lateral motion. The forward motion of frame 42 also results in the forward motion of end engaging member 36 and also the motion of compression members 60 in a direction apart from one another, thereby releasing cartridge 12. Cartridge 12 is subsequently pushed back out of opening 16 in a reverse manner to the operation of receptacle 10 as shown and described in FIGS. 3, 4 and 5.

Of course, the cartridge ejection means may be any suitable mechanical or electromechanical device, such as a linear motion stepper motor or a conventional AC or DC motor mechanically coupled to a mechanism suitable for exerting a force on movable frame 42 which results in the forward motion of the frame and the subsequent ejection of the cartridge.

Figure 7:
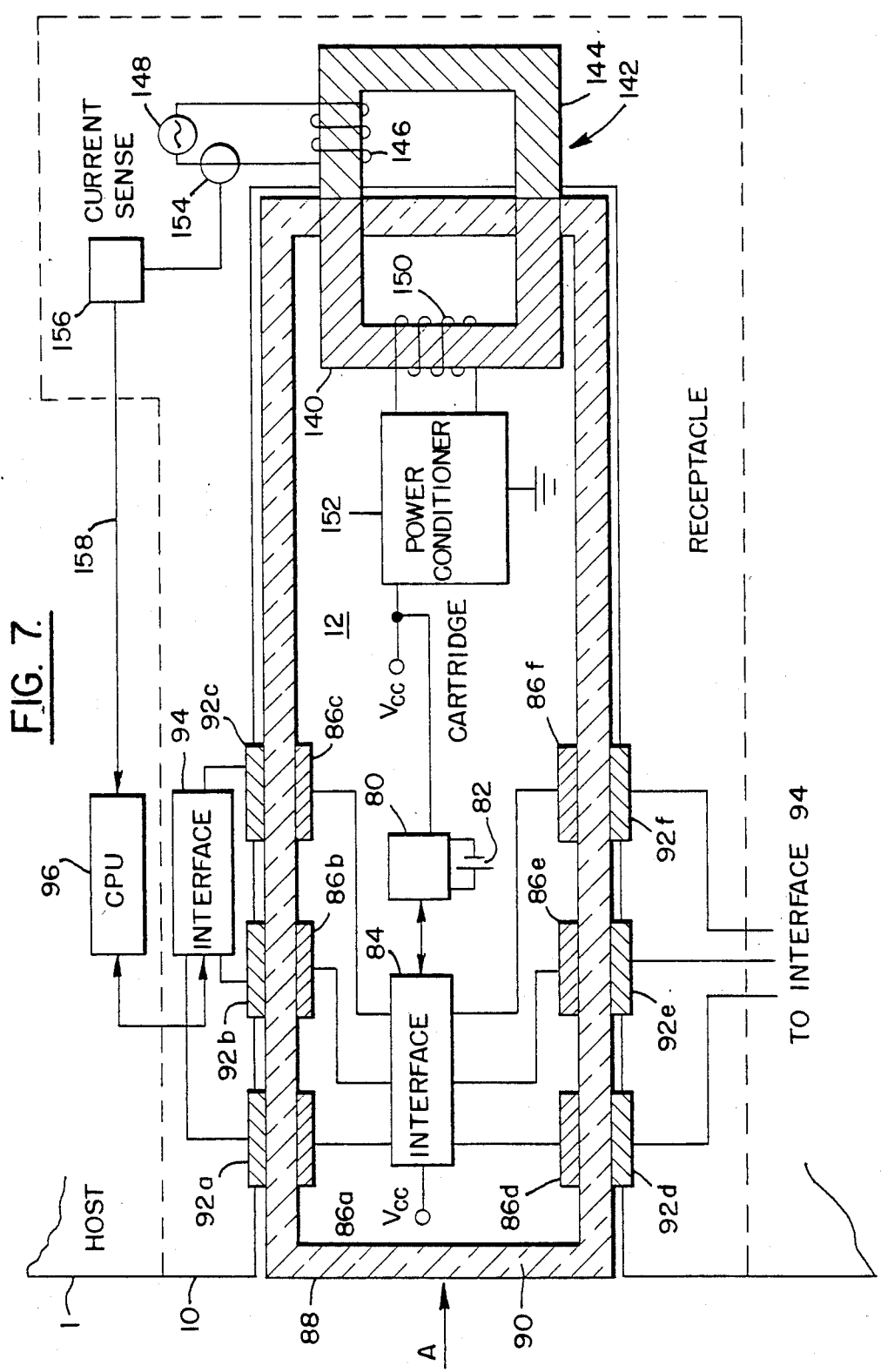
FIG. 7 is a side cutaway view, in block diagram form, of a vault cartridge coupled to an application host computer.

Referring now to FIG. 7 there is shown in block diagram form the data storage module device, or vault cartridge 12, coupled to the host device, or application's host computer 1. Vault 12 is comprised of a data storage means such as a random access memory (RAM) 80 which is operable for the read/write storage of data within. RAM 80 may be a nonvolatile data storage device. For example, RAM 80 may have a battery 82 coupled thereto for maintaining the data stored within the RAM 80 when the vault 12 is uncoupled from the host 1. Vault 12 may also comprise a memory interface 84 which is operable for providing address, data and control lines to the RAM 80 for storing and retrieving data therefrom. Interface 84 may also comprise data transmission and reception circuitry. Of course, interface 84 may also comprise a data processing means such as a microcomputer device having program and data storage and which is operable for at least storing and retrieving data within RAM 80.

In accordance with the invention, vault 12 also comprises a plurality of conductive members such as plates 86a through 86f, the plates 86 being conductively coupled to interface 84. As can be seen, the plates 86 are disposed beneath or inside of an outer surface 88 of the vault 12. The surface 88 can be seen to be the outer surface of a module casing or enclosure 90 which may be comprised of an insulating thermoplastic material. The enclosure 90 serves to both protect the components within the vault 12 and also serves as a capacitor dielectric material, as will be discussed hereinafter.

Host 1 can be seen to comprise the vault receptacle 10 which, as has been previously stated, may be physically separate from the host 1 or integrally joined thereto. Receptacle 10 also comprises a plurality of conductive members such as plates 92a through 92f which are disposed such that these plates 92 are in registration with corresponding plates 86a through 86f when vault 12 is fully inserted within the receptacle 10. Plates 92 may, in accordance with the invention, be placed in physical contact with the outer surface 88 of enclosure 90 by the operation of the vault receptacle 10, the receptacle being operated to insert, retain and withdraw the vault 12 as has been described above. Plates 92 are coupled to a host interface 94 which in turn may be coupled to a host data controlling device, such as a central processing unit (CPU) 96. Host interface 94 may comprise data transmission and reception circuitry.

As is apparent in FIG. 7, when the vault 12 is fully inserted within the receptacle 10 adjacently disposed corresponding plates, such as the plates 86a and 92a, form the opposing plates of an electrical capacitor. The material of enclosure 90 between these plates serves as a capacitor dielectric material. In accordance with one aspect of the invention, each of these capacitors so formed, in conjunction with interfaces 84 and 94, is operable for the transmission and reception of data and other signals therethrough.

Although six such capacitors are shown in FIG. 7, it should be realized that more or less than six capacitors may be employed for a given application. As an example, eight such capacitors may be provided for coupling a byte comprised of eight bits of data, another eight capacitors may be provided for coupling eight memory address lines and one or more capacitors may be provided for coupling a memory control line such as a read or a write control line or for coupling a synchronization signal such as a constant frequency clock signal. For example, with 17 such lines provided it is possible for the host 1 to store and retrieve up to 256 eight bit bytes of data from the memory 80.

Figure 8:
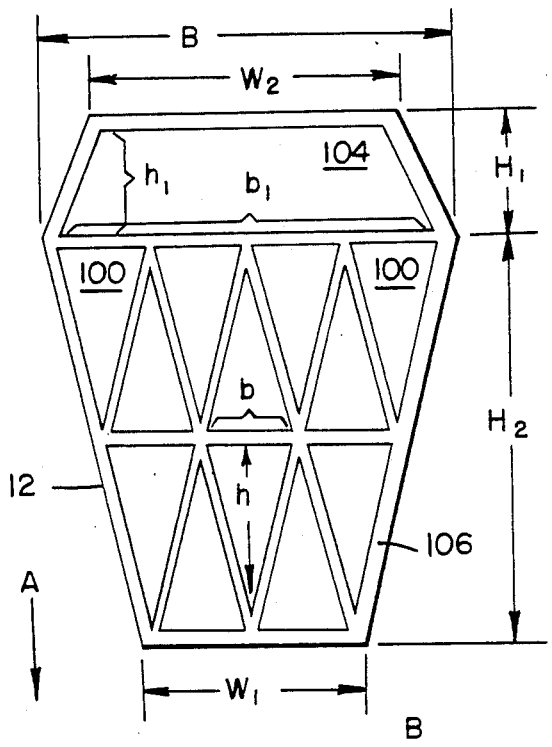
FIG. 8 is a top view showing conductive plate members disposed beneath one surface of a vault cartridge.

Referring now to FIG. 8 there is shown a top view of one embodiment of the vault cartridge 12 having a plurality of conductive plates 100 disposed beneath a top surface thereof. In FIG. 8 the top surface of the cartridge 12 has been cut away to show the plates.

Figure 8A:
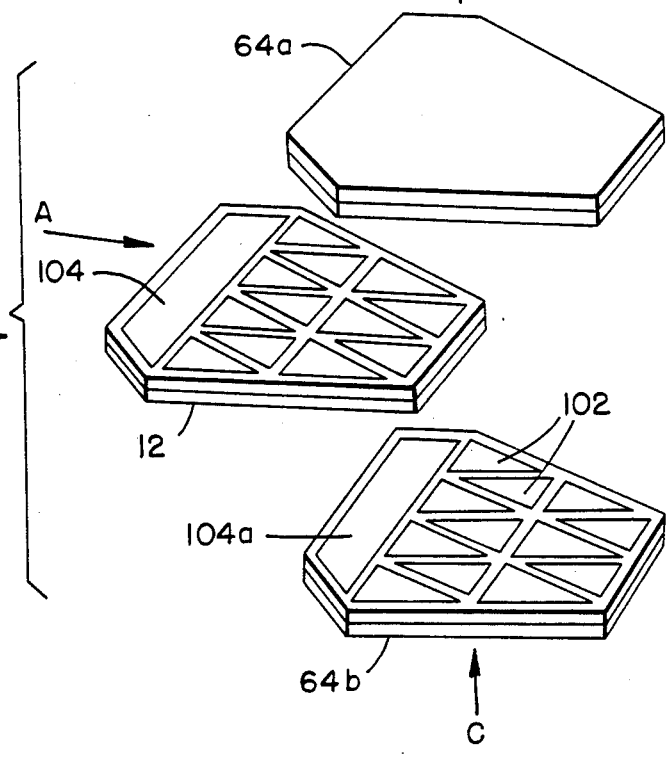
FIG. 8a is an elevational view showing the vault cartridge of FIG. 8 and a pair of opposed cartridge engaging members.

As has been stated, and as can be seen in FIG. 8 cartridge 30 has a planar asymmetrical shape which resembles two trapezoids each having a common, equal base (B) and unequal heights ($H_1$ and $H_2$) measured from the base. Such a shape results in the cartridge 12 having inwardly tapered side surfaces which may have an angle of approximately 15° as measured from the common base. When installed within the receptacle 10 the cartridge top and bottom surfaces, as shown in FIG. 8a, are firmly engaged between the opposing pair of bearing members 64a and 64b, each of the bearing members 64 having corresponding plates 102 whereby the individual signal and ground coupling capacitors are formed. As has been described, the insertion of cartridge 12 into receptacle 10 causes the movement of members 64a and 64b as depicted by arrows B and C. When fully inserted, cartridge 12 is securely interposed between the members 64, the top and bottom surface plates of cartridge 12 being aligned with the corresponding plates 102 of members 64.

As can be seen, the plates 100 and 102 may have an essentially triangular shape such that the utilization of the surface area of cartridge 12 is optimized. In accordance with the invention, each of the plates 100 is coupled within the cartridge 12 to a suitable data transmission and reception circuit. Also provided on the surface of cartridge 12 may be an essentially trapezoidal plate 104 which is operable for providing a ground reference with the host 1. Due to the asymmetrical shape of cartridge 12, the cartridge may be installed within the receptacle in only one given manner, such as in the direction of the arrow A, thereby facilitating the alignment and registration of each of the plates 100 and 104 with the corresponding plate of similar shape within the receptacle. The plate configuration as shown in FIG. 8, it should be realized, is preferably duplicated upon a bottom surface of the cartridge 12. Thus, a total of 24 capacitive plates may be provided for the coupling of digital signals while two plates are provided for the coupling of the ground reference. It should be further realized that each of the plates 100 and 102 is preferably disposed beneath the insulating surface (not shown) of cartridge 30, the enclosure material serving as a capacitive dielectric. The individual plates may be fabricated by a number of well known methods, such as by forming all of the plates 100 and 104 upon a surface of a common nonconducting substrate 106 by well known printed circuit fabrication techniques.

In a preferred embodiment, the approximate dimensions (in inches) shown in FIG. 8 are as follows:

$B = 3.5$
$H_1 = 1.0$
$H_2 = 3.5$
$W_1 = 2.0$
$W_2 = 2.75$
$b = 0.75$
$h = 1.5$
$b_1 = 3.75$
$h_1 = 0.9$

Of course, the overall shape of cartridge 12 of FIG. 8 and the shape, dimensions, number and placement of the plates 100 and 102 is illustrative only, it being realized that the particular shape, dimensions, number and placement of the plates is a matter which may be application dependent.

Figure 9:
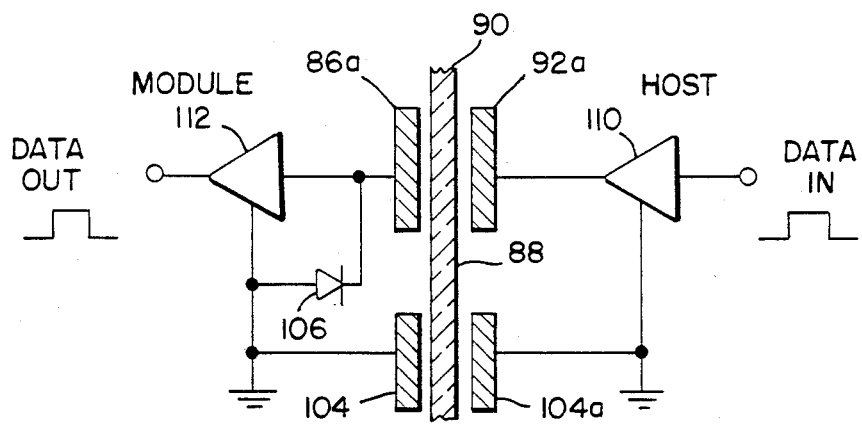
FIG. 9 is a simplified schematic diagram showing operable for unidirectional capacitively coupled transmission and reception of digital signals.

Referring now to FIG. 9 there is shown one embodiment of interface circuitry which is operable for coupling a signal through a pair of opposing plates, such as the plates 86a and 92a of FIG. 7. As can be seen, the plate 92a is coupled to the output of a driver device 110 within the host. The input to driver device 110 may be a data line or an address line the state of which is typically controlled by CPU 96. The opposing plates 86a and 92a form a capacitor having a dielectric material interposed between the plates, the dielectric comprising an interposed portion of the enclosure 90 of the vault 12. As can be seen, each of the devices 110 and 112 may have a ground reference coupled therebetween by a capacitor formed by the plate 104 of FIG. 8 and a corresponding plate 104a in the vault receptacle. A diode 106 may be provided at the input to device 112 for clamping the transmitted data signal to the ground reference. Of course, the diode may be integrally formed within the semiconductor device 112, it being well known that such semiconductor devices often have diodes, such as Schottky diodes, provided at their inputs.

In operation, device 110 will provide an electrical potential upon the plate 92a. This electrical potential will be coupled through the dielectric material of the enclosure 90 resulting in the transfer of charge to plate 86a. This charge is detected by device 112 and is expressed in the output of device 112. Thus, it can be seen that if device 110 impresses a time varying electrical potential upon plate 92a that the output of device 112 will be expressive of the time varying input signal to device 110. This capacitive coupling technique of the invention is well suited for coupling digital data signals at high speed through the opposing plates 86a and 92a.

Figure 10:
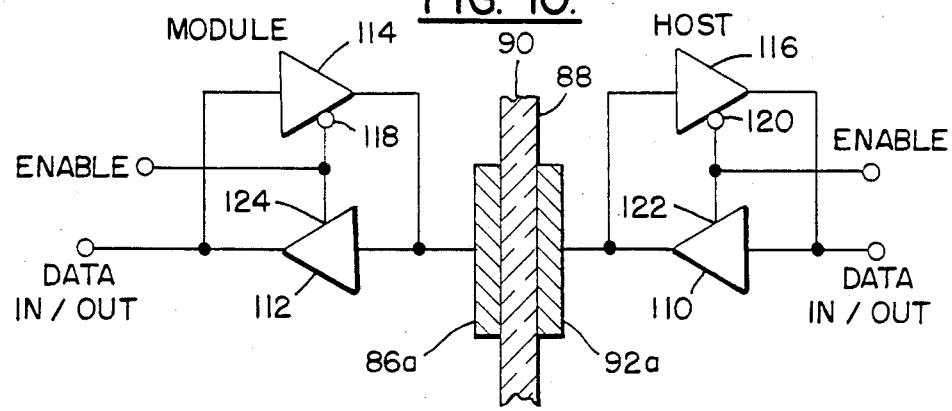
FIG. 10 is a simplified schematic diagram showing circuitry operable for bidirectional capacitively coupled transmission and reception of digital signals.

Referring to FIG. 10 there is shown circuitry operable for the bidirectional communication of data through a single pair of plates such as the plates 86a and 92a. As can be seen, each of the plates is provided with an opposing pair of data drivers and receivers in addition to the driver 110 and receiver 112 of FIG. 9. These additional drivers and receivers 114 and 116, respectively, may each be provided with an active low enabling input 118 and 120, respectively, while driver 110 and receiver 112 are each provided with an active high enabling input 122 and 124, respectively. Thus, it can be seen that when an ENABLE signal is at a logic high that the lower driver/receiver 110 and 112 is operable for transmitting a bit of data from the right to the left as shown in FIG. 10 while the upper pair 114 and 116 is disabled. When the ENABLE signal is at a logic low level, the upper driver/receiver pair 114 and 116 is operable for transmitting a bit of data from the left to the right of FIG. 10, while the lower pair 110 and 112 is disabled.

Of course, a number of different types of suitable data drivers and receivers may be utilized for transmitting and receiving bits of information through a respective pair of capacitive plates, it being realized that the devices shown in FIGS. 9 and 10 are illustrative only.

It has been found that if each conductive plate of a pair of plates, such as the triangular plates 100 of FIG. 8, have a surface area of approximately 0.7 inches and that if the plates are separated by an enclosure wall having a thickness of approximately 0.02 inch, the enclosure wall material having an intrinsic dielectric constant of approximately 4.0 to 4.9, that the capacitance value associated with a pair of such plates will be in a range of approximately 12 to 35 picofarads at a frequency of approximately one MHz. This value of capacitance is within the range of capacitance which may be driven by an integrated circuit data transmission device at a high data transmission rate.

Referring once more to FIG. 7 there is shown another aspect of the invention wherein it can be seen that cartridge 12 also comprises a secondary portion 140 of a magnetic power coupling means, such as a power transformer 142. A primary portion 144 of the transformer 142 is provided within the vault receptacle 10. Primary and secondary portions 144 and 140, respectively, are comprised of a suitable conductive magnetic core material, such as is typically found in power transformers. That is, the core material may be a laminated type of metallic or ceramometalic core material or may be a solid type of core material. Primary portion 144 has a primary winding 146 disposed thereabout, the primary winding 146 being coupled to a source 148 of excitation energy. Secondary portion 140 has a secondary winding 150 disposed thereabout, the secondary winding 150 being coupled to a power conditioner 152 such as a well known full wave or half wave rectifier circuit. Power conditioner 152 may also have voltage filtering and regulation circuitry suitable for deriving DC voltages which are utilized by the circuits within the cartridge 12 for operating power. For example, as shown in FIG. 7 power conditioner 152 has an output voltage Vcc and a ground reference. It should be realized, however, that power conditioner 152 may have a plurality of DC output voltages such as, for example, plus 5 volts, plus 12 volts, minus 12 volts and minus 5 volts. Circuits operable for deriving such DC voltages from the secondary of a power transformer are well known in the art and will not be further described herein.

There may also be coupled to primary winding 146 a current sense means 154 and a current sense circuit 156 having an output 158 for indicating to CPU 96 when primary current is flowing within the primary 146. This primary current in general flows when the cartridge 12 is inserted within the receptacle 10. Thus, the output 158 is expressive of the coupling state of cartridge 12, that is, the output 158 is indicative of whether the cartridge 12 is installed or is not installed within the receptacle 10.

In accordance with this aspect of the invention, the power transformer 142 is provided as two distinct portions, those portions being the primary 144 and secondary 140. In order to provide for coupling the magnetic flux induced by primary winding 140 through the core when the cartridge 12 is inserted within the receptacle 10 the secondary portion 140 may be disposed such that it extends at end portions thereof through the wall 90 of cartridge 12. Thus, when the cartridge 12 is inserted within the receptacle 10, the exposed surface of each end of the secondary portion 140 is in physical contact with similarly exposed portions of the primary portion 144. Such intimate contact allows for magnetic flux coupling from the primary winding 146 to the secondary winding 150 through the intervening core material with a minimal amount of coupling loss. Of course, the secondary 140 may be also covered by the wall 90 if the wall thickness and the amount of power of primary excitation 148 are such that sufficient magnetic coupling is provided through the intervening gap defined by the wall 90 material.

Figure 11:
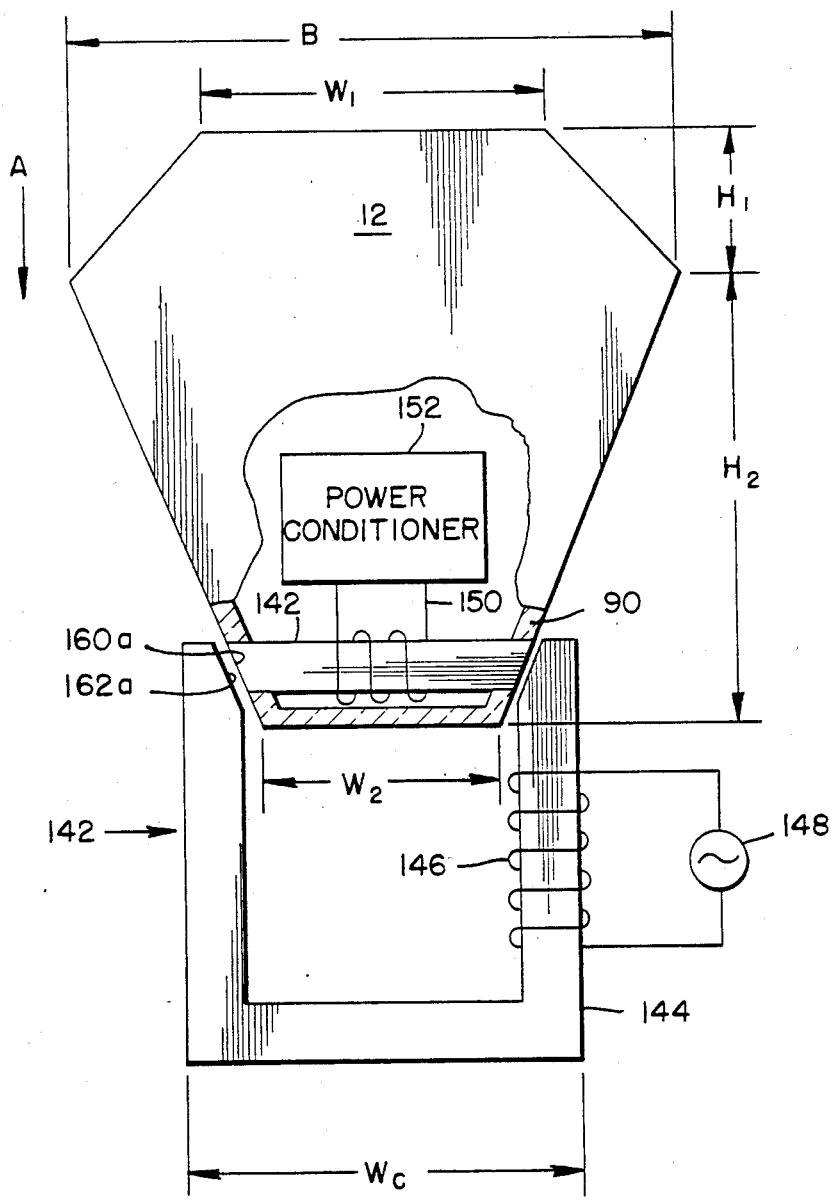
FIG. 11 is a top view, partially in block diagram form, of a vault cartridge and a receptacle showing the primary and secondary portions of the magnetic power coupling means.

Referring now to FIG. 11 there is shown a preferred embodiment of the secondary portion 140 and the primary portion 144 of the magnetic power coupler. As can be seen, the overall transformer 142 may have a generally square or rectangular shape, the shape being defined by the shape of the core material. The primary portion 144 of the core material may have a generally "U" shape and the secondary portion 142 of the core may have a linear shape predetermined to fit within the upper open arms of the primary. The secondary and primary portions 142 and 144, respectively, may have beveled mating edges 160a and 162a, respectively. The beveled edges are disposed such that when the cartridge 12 is inserted within the receptacle 10 in the direction indicated by the arrow A the edges are brought into physical contact one with the other. It can further be seen in FIG. 11 that the shape of the outer wall 90 of cartridge 12 is substantially equal to the angle of the bevel of the edges of the core. The core material of the secondary portion 142 is disposed within the cartridge 12 such that the outer surface of each end of the core material is exposed upon an outer surface of the wall 88. When cartridge 12 is fully inserted within the receptacle 10 and, also, within primary portion 144, magnetic flux continuity is established through the core material resulting in the maximization of the magnetic coupling from the primary winding 146 to the secondary winding 150. The opposing faces of the primary and secondary portions of the core material may have any suitable angle of bevel, or may not be beveled at all. It can be appreciated, however, that the greater the angle of bevel the greater will be the surface area which is in contact, thereby minimizing any coupling losses which may be due to misregistration and misalignment between the cartridge 12 and the receptacle 10. In a preferred embodiment of the invention the core material may have a thickness of approximately 0.125 inch and a width ($W_c$) of approximately 3.15 inches. The length of secondary 24 is approximately 2.5 inches. The ratio of turns between primary winding 146 and secondary winding 150 is determined by a number of factors, such as the characteristics of the core material, the desired output voltage and other well known parameters.

It should be realized that any shape may be employed for the primary and secondary portions of the power transformer 142, such as a toroidal shape, so long as the chosen shape is amenable to being partitioned into a primary portion and into a secondary portion which fits within the primary portion and magnetically engages therewith to complete the magnetic flux circuit path.

As has been previously described cartridge 12 has a planar asymmetrical shape defined by two trapezoids each having a common, equal base (B) and unequal heights (H) measured from the base. Such a shape results in the inwardly tapered side surfaces which provide the aforedescribed bevel to primary and secondary core portions 144 and 142, respectively. For example, the taper angle as measured from the common base may be approximately 15°. Primary 144 is disposed within receptacle 10 such that when cartridge 12 is fully inserted the front portion of cartridge 12 butts up against primary 144, thereby causing secondary 140 to be aligned with primary 144. As can be appreciated, the inwardly sloping side edges of cartridge 12, in conjunction with the corresponding tapered shape of primary 144, facilitates the alignment of cartridge 12 during insertion. It can be seen that the members 32 and 34 of FIG. 2 correspond to the primary 144.

Figure 12:
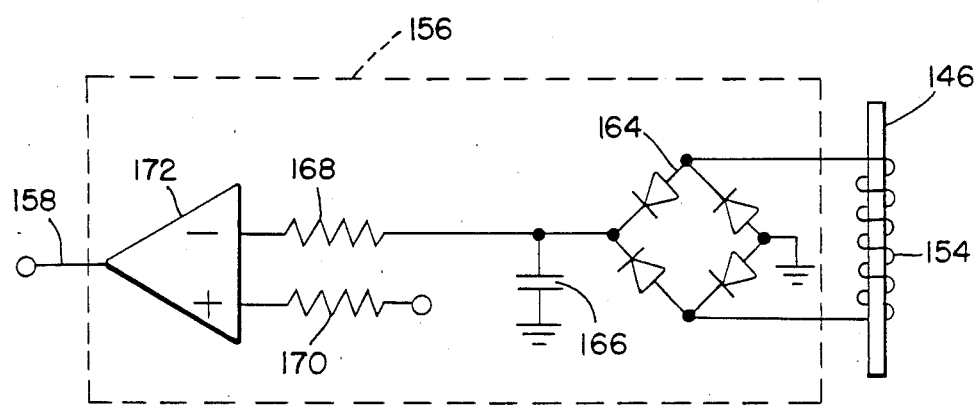
FIG. 12 is a simplified schematic diagram of a primary winding current sense means.

As has been previously stated, there may be a current sensing device 154 and a current sense circuit 156 coupled to primary winding 146. As can be seen in FIG. 12, current sense device 154 may be a conductor which is wound about a portion of the primary winding 144. Coupled to the current sense device 154 may be a full wave diode bridge 164 for rectifying the current coupled into the current sense device 154 from the primary winding 144. A capacitor 166 charges to a voltage potential which is indicative of the magnitude of the current flowing through the primary winding 144. First and second resistors 168 and 170, respectively, are coupled to an operational amplifier 172 which is configured in a voltage comparator configuration. A voltage reference $V_{REF}$ is provided at one end of resistor 170, the magnitude of $V_{REF}$ being predetermined such that when the cartridge 12 is inserted within the receptacle 10 the induced voltage due to the current flowing through primary winding 144 exceeds, at capacitor 166, the magnitude of $V_{REF}$. This causes the output 158 of comparator 172 to change state. Output 158 may be coupled to CPU 96, such as by coupling the output 158 to an interrupt input (not shown) of CPU 96. Thus, when the cartridge 12 is inserted or withdrawn from the receptacle 10 the change in primary current flow is sensed and the CPU 96 is thereby apprised of whether the cartridge 12 is inserted or withdrawn. As can be realized, if the cartridge 12 is not installed or coupled to the receptacle 10 the power transformer is in an essentially "open circuit" condition and negligible primary current will flow. When the cartridge 12 is coupled to the receptacle the secondary of the transformer and the load coupled thereto will result in the flow of primary current, the flow of which is detected by the current sense device 154 and associated circuitry.

Power source 148 may be a 400 HZ power source or may have any frequency suitable for being coupled through the core material from the primary 144 to the secondary 142. As is well known, the higher the frequency of the source 148 the smaller need be the associated magnetic and capacitive components of the power supply. Such a reduction in size of the power supply components may be a desirable feature in a portable data storage module such as the vault cartridge 12. In general, it is desirable to maximize the frequency of power source 148 while yet providing for reliable power coupling. Of course, any frequency may be utilized so long as the primary 144 and the secondary 142 portion of the power coupling means are designed to accommodate the chosen frequency.

It can be appreciated that a number of benefits accrue from the use of this aspect of the invention. One benefit is that the magnetic power coupling means permits the coupling of power into an essentially sealed module without the use of card edge type of connectors which are susceptible to wear and degradation after a number of insertions and withdrawals. The use of the invention also eliminates the possibility of malfunctioning or damage to the circuits within the cartridge 12 due to the disruption of DC power and ground connections, such as when the ground connection is disconnected before the DC power connection is disconnected. Another advantage is that if a plurality of DC voltages are required within the cartridge 12 that individual power connectors need not be provided for each of the required voltages. The use of the invention provides for one pair of contacts upon the surface of the cartridge 12 from which a large number of different DC voltages may be derived by the power conditioner 152. A still further advantage that accrues from the use of the invention is that by means of the aforedescribed current sense circuitry coupled to the primary winding 144, the host system may be apprised at any time of whether the cartridge is installed or withdrawn from the receptacle 10.

Obviously, numerous modifications and variations of the present invention are possible in light of the above teachings. It is therefore to be understood that within the scope of the appended claims, the invention may be practiced otherwise than as specifically described herein.

What is claimed is:

1. A data storage system comprising:
a data storage device having a front surface and at least one horizontal planar surface and comprising data storage means coupled to data storage interface means, said interface means comprising means for coupling data signals between said device and a host system, said interface means comprising a first plurality of conductive plate means disposed beneath said planar surface of said device;
said device further comprising a secondary portion of a power transformer including a secondary core having a secondary winding disposed thereabout, said secondary winding being electrically coupled to a power conditioning means operable for deriving device operating power from said secondary winding;
said system further comprising:
apparatus for securely retaining said device during the storage of data therein said apparatus comprising:
means for engaging said front surface of said device as said device is inserted within said apparatus, said engaging means being capable of movement, in response to said insertion of said device, between at least a first position and a second position;
means for engaging said horizontal planar surface of said device; and
means for activating said device planar surface engaging means, said means for activating being coupled to said front surface engaging means and responsive to said movement thereof for causing said device planar surface engaging means to securely engage said device planar surface in response to said front surface engaging means moving to said second position and wherein:
said device planar surface engaging means comprises a second plurality of conductive plate means for contacting said planar surface of said device, said second plurality of plate means being disposed in registration with said first plurality of plate means for defining a plurality of electrical capacitors individual ones of which are comprised of corresponding ones of said first and said second plurality of plate means, each of said capacitors being a data signal coupling capacitor for coupling at least data signals between said device and said host system;
said apparatus further comprising:
a primary portion of said power transformer being disposed at said second position for magnetically coupling operating power to said secondary portion when said device is at said second position, said primary core having a primary winding disposed thereabout and a source of excitation energy coupled to said primary winding.

2. The system of claim 1 wherein said device has inwardly tapering side surfaces and wherein said apparatus further comprises:
means responsive to the insertion of said device for continuously engaging opposing side surfaces of said device as said device is inserted, said side surface engaging means being operable for movement along an axis substantially perpendicular to a longitudinal centerline of said device.

3. The system of claim 2 further comprising:
means for locking said side surface engaging means to prevent said movement of said side surface engaging means, said locking means being coupled to said activating means for locking said side surface engaging means when said front surface engaging means moves to said second position.

4. The system of claim 3 wherein said side surface engaging means comprises a pair of opposed rollers each of which is journaled for rotation on a roller supporting member, each of said roller supporting members being coupled to a biasing means for urging one of said rollers against one side of said side surfaces of said device.

5. The system of claim 4 wherein said device has an asymmetrical side surface contour and wherein each of said rollers has a corresponding side surface contour for allowing said device to be inserted between said rollers in only a predetermined orientation of said device.

6. The system of claim 1 wherein said planar surface engaging means comprises a top surface engaging member and an opposed bottom surface engaging member, both of said top and bottom surface engaging members being coupled to said activating means for compressively engaging a top and a bottom surface of said device, both of said top and bottom surface engaging means having a plurality of said plate means disposed thereon for defining said plurality of data disposed coupling capacitors with corresponding plate means disposed within said device adjacent to a top and a bottom surface of said device.

7. The apparatus of claim 6 wherein each of said top and said bottom surface engaging means have a shape substantially identical to the shaped of said device top surface and said device bottom surface, respectively, and wherein each of said top and said bottom surface engaging means are further comprised of a resilient material whereby said device is securely retained therebetween.

8. The apparatus of claim 7 wherein said shape is defined by two trapezoids having a common base and unequal heights, and wherein said base has a length of approximately 3.5 inches, one of said heights is approximately one inch and the other of said heights is approximately 3.5 inches.

9. A system for receiving, aligning, retaining and coupling operating power and data signals to a device inserted within, said system including a receptacle for said device, said device having side surfaces, a front surface, and top and bottom surfaces, comprising:
- a plurality of roller means each of which comprises a roller and a roller supporting member, each of said rollers being disposed to continuously engage a side surface of said device as said device is inserted into said receptacle, each of said supporting members being adapted for lateral movement relative to said side surfaces of said device for urging said rollers against said side surfaces, said device passing between said rollers as said device is inserted;
- device front surface engaging means disposed to engage a front surface of said device as said device passes between said rollers;
- movable frame means fixedly coupled to said front surface engaging means such that as said front surface of said deice engages and bears upon said front surface engaging means said movable frame means moves in a backward direction away from said roller means;
- a plurality of movable arm means each of which is rotatably coupled at a first end thereof to said movable frame means such that as said movable frame means moves in said backward direction away from said roller means a second end of each of said movable arm means moves in an arcuate manner towards said roller means;
- a plurality of roller locking means each one of which is rotatably coupled at a first end thereof to said second end of one of said movable arm means such that said arcuate motion of said movable arm means causes a second end of each of said locking means to move in a forward direction towards said roller means, said second end of each of said locking means engaging with one of said roller supporting members to substantially prevent said lateral movement of said roller supporting member;
- device compression means comprising two opposed horizontally disposed planar bearing members and also a vertically disposed planar member which is joined along at least one edge to a top surface of each of said bearing members, a bottom surface of each of said bearing members being oppositely disposed one to another and having a shape adapted for engaging a top and a bottom surfaces of said device therebetween, said compression means further comprising biasing means for urging said bottom surface of each of said bearing members towards one another to securely engage said device therebetween, each of said vertically disposed planar members being movably coupled to said movable frame means such that said backwards motion of said movable frame means urges each of said planar bearing members toward one another, each of said bearing members further having:
- a plurality of conductive plate members disposed upon said bottom surface thereof, each of said plate members being coupled to a signal transmission and reception means, each of said plate members being disposed such that individual ones of said plate members are in registration with a corresponding plate member disposed beneath said top and said bottom surfaces of said device for defining a plurality of signal coupling capacitors operable for coupling at least data signals into and out of said device;

said system further comprising:
- device stop means having an interiorly disposed opening having a shape operable for receiving therein at least a portion of said side surfaces of said device, said device stop means being disposed relative to said roller means for defining a furthest extent of insertion of said device, said device stop means comprising:
- a substantially U-shaped primary portion of a power transformer core disposed relative to said device for contacting opposing ends of a secondary portion of a power transformer core disposed within said deice, said opposing ends being exposed upon said side surface of said device, said primary portion being comprised of said primary core having a primary winding disposed thereabout and a source of excitation energy coupled to said primary winding such that at the furthest extent of insertion of said device said device is provided with operating power.

10. A system as defined in claim 9 wherein said device has a nonsymmetrical horizontally planar shape and wherein each of said roller means further comprises biasing means for said rollers against said side surface of said device.

11. A system as defined in claim 10 wherein said movable frame means comprises:
- a substantially U-shaped member having a .L vertical member and a first and a second horizontally disposed forward projecting members extending therefrom, each of said forward projecting members having an end having a substantially right angle projection extending therefrom;
- a third horizontally disposed forward projecting member extending from a centrally disposed portion of said vertical member, a forward end of said third member being attached to a rear surface of said device front surface engaging means; and
- a pin projecting upwardly from said third member from a rearwardly disposed portion of said third member proximal to said vertical member, said pin rotatably coupling said plurality of movable arm means to said movable frame means.

12. A system as defined in claim 11 wherein each of said ends having a substantially right angle projection is disposed within an elongated diagonal slot within said vertically disposed planar members for movably coupling each of said device compression means to said movable frame means, each of said ends being slideably coupled to one of said diagonal slots such that said backwards motion of said movable frame means causes each of said ends to slide upwardly in one of said slots, thereby urging said planar bearing members towards one another for engaging said plurality of plate members upon said top and bottom surfaces of said device.

13. A system as defined in claim 12 wherein a front surface of said device engaging means has an indentation made therein for engaging said front surface of said device.

14. A system as defined in claim 13 wherein said device has nonsymmetrical front, back and side surfaces having an upper surface portion defined by a first radius of curvature and a lower surface portion defined by a second radius of curvature and wherein said indentation has a variably contoured shape for receiving said front side surface therein in only a single orientation.

15. A system as defined in claim 14 wherein each of said rollers has a variably contoured shape for engaging said nonsymmetrical side surfaces of said device only a single orientation.

16. A system as defined in claim 9 further comprising device ejecting means coupled to said movable frame for moving said movable frame means and said device front surface engaging means in a forward direction towards said roller means whereby said device passes back through said rollers and out of said receptacle.

17. A system as defined in claim 16 wherein said device ejecting means comprises a member adapted for linear motion in a direction substantially opposite to said motion of said movable frame means during said insertion of said device, said member being coupled to said movable frame means for moving said frame means.

18. A system as defined in claim 9 wherein said excitation energy has a frequency associated therewith of approximately 400 Hz.

19. A system as defined in claim 18 wherein said primary portion further comprises primary current sense means operatively coupled to said primary winding for sensing a magnitude of current therein, said current sense means having an output expressive of the current in said primary winding.

20. A system as defined in claim 19 wherein said output is operatively coupled to a host system whereby said host system is enabled to determine if the device is coupled to or uncoupled from said receptacle.

21. A device for storing data comprising:
means operable for storing digital data;
an enclosure for enclosing said data storage means within;
a first plurality of conductive plate-like members coplanarly disposed along at least one inner surface of said enclosure, each of said first plurality of embers being operatively coupled to said data storage means, each of said first plurality of members further being operable, when a second plurality of plate-like members are disposed along an outer surface of said enclosure, for defining a signal coupling capacitor for coupling data into said device for storage within said data storage means; and a secondary of a power transformer comprising a magnetic core material having a secondary winding magnetically coupled to said core material, said core material having first and second ends each of which extends through said enclosure such that each is exposed upon said outer surface thereof such that corresponding ends of a primary of a power transformer contacted to said secondary ends causes said secondary winding to generate operating power for said device.

22. A device as defined in claim 21 wherein said data storage means is a nonvolatile data storage device.

23. A device as defined in claim 22 wherein said enclosure is detachably coupled to said second plurality of plate-like members.

24. A device as defined in claim 23 wherein said device has a planar shape defined by two trapezoids having a common base and unequal heights.

25. A device as defined in claim 24 wherein said device has inwardly tapering side edge surfaces having a given angle of taper from said base and wherein said secondary portion has tapered opposing end surfaces exposed upon outer side walls of said device.

26. A device as defined in claim 25 wherein said primary portion has opposing tapered end surfaces adapted for physically engaging said tapered end surfaces of said secondary portion.

27. A device as defined in claim 26 wherein said given angle is approximately 15 degrees.

28. A device as defined in claim 27 wherein said secondary portion has a length of approximately 2.5 inches and a thickness of approximately 0.125 inch.

* * * * *